(12) United States Patent
Suzuki et al.

(10) Patent No.: US 6,731,399 B2
(45) Date of Patent: *May 4, 2004

(54) SYSTEM FOR PROCESSING A COLOR IMAGE

(75) Inventors: Yasumichi Suzuki, Tokyo (JP); Yoshinori Ikeda, Kawasaki (JP); Satoshi Tanio, Tokyo (JP); Ritsushi Tanabe, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 07/904,562

(22) Filed: Jun. 26, 1992

(65) Prior Publication Data

US 2003/0035125 A1 Feb. 20, 2003

(30) Foreign Application Priority Data

Jun. 28, 1991 (JP) .............................. 3-158473
May 27, 1992 (JP) .............................. 4-135090

(51) Int. Cl.$^7$ ............................................. G06F 15/00
(52) U.S. Cl. ...................................... 358/1.9; 358/518
(58) Field of Search .................. 358/500, 75, 450, 358/462, 518, 540, 80; 395/109, 162, 164, 163; 382/162, 164, 167

(56) References Cited

U.S. PATENT DOCUMENTS 4,675,831 A * 6/1987 Ito et al. ..................... 364/518
4,682,190 A * 7/1987 Ikeda .......................... 346/154
4,814,824 A * 3/1989 Ito et al. ........................ 399/82
4,868,643 A * 9/1989 Taguchi ....................... 358/78
5,028,992 A 7/1991 Arai ............................. 358/75
5,032,928 A 7/1991 Sakai et al. ................. 358/448
5,068,783 A * 11/1991 Tanagawa et al. ...... 395/183.03
5,079,625 A 1/1992 Kitamura et al. ............. 358/75
5,113,356 A * 5/1992 Nickell et al. ............... 395/108
5,138,443 A * 8/1992 Ikeda et al. .................... 358/80
5,142,374 A * 8/1992 Tajika et al. ................. 358/534
5,144,372 A * 9/1992 Miyamoto et al. .......... 399/184
5,153,749 A * 10/1992 Katayama .................... 358/447
5,157,739 A * 10/1992 Masaki et al. ................ 383/49
5,191,647 A * 3/1993 Masaki ....................... 395/164

FOREIGN PATENT DOCUMENTS

EP 311111 4/1989 .......... G06K/15/00

* cited by examiner

*Primary Examiner*—Gabriel Garcia
(74) *Attorney, Agent, or Firm*—Fitzpatrick, Cella, Harper & Scinto

(57) ABSTRACT

A color image processing system is provided which receives binary image data from an external device, which generates the binary image data, so as to form color images. This system has a first mode in which a receiving side receives the same binary image signal color plane by color plane so that a color process is performed. It also has a second mode in which a printer receives binary image data in a plane sequence, which data indicates color planes corresponding to the types of coloring materials used for a printing operation of the printer, and then, the printer performs binary printing in accordance with the binary image data. An indicating device for indicating the first or second mode selects the first or second mode with respect to the binary image data from the external unit.

8 Claims, 8 Drawing Sheets

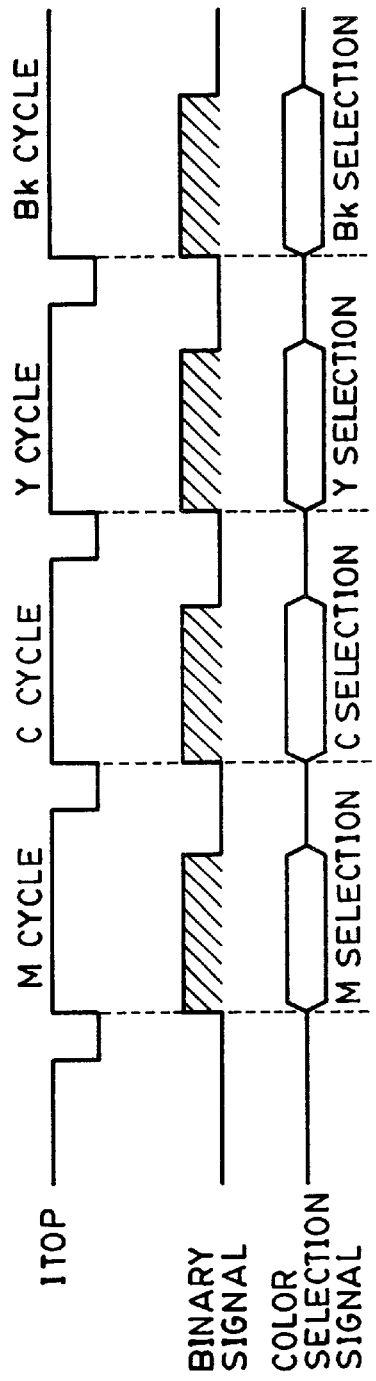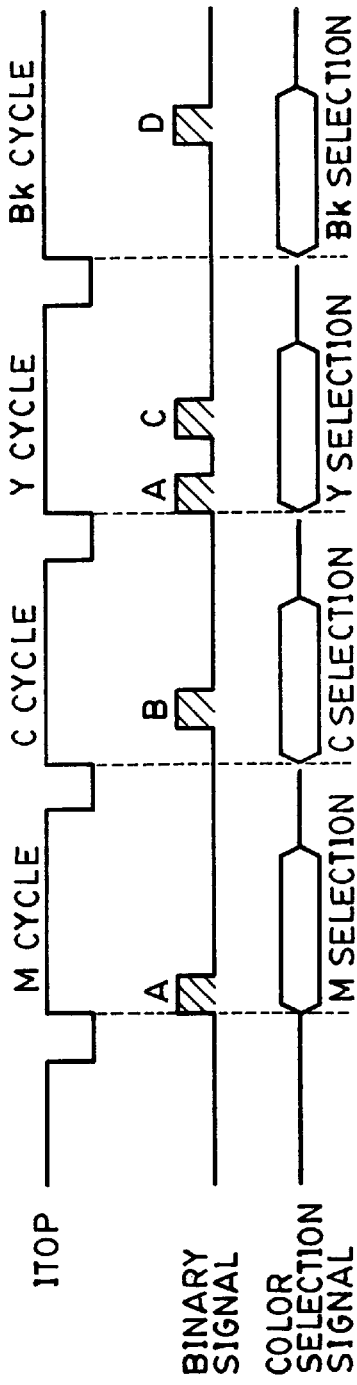

SYSTEM FOR PROCESSING A COLOR IMAGE

BACKGROUND OF THE INVENTION

1. Field of the Invention

The present invention relates to a system for processing a color image and, more particularly, to a color image processing system in which image data is input to obtain a color image.

2. Description of the Related Art

In connection with the increase in use of digital color copying machines in recent years, there has been marketed a type of system which is connected to a computer and outputs CG and line images produced by the computer, or outputs of natural images which have been read by a scanner and then input to the computer. In such a system, to provide an interface between the computer and copying machine, the computer is connected to the copying machine through an interface unit (hereinafter referred to as an IU) having a memory. In many cases, the memory has a storage for storing multi-value data, such as natural images, and another storage for storing binary data, such as characters and line images, thus making it easy to handle the multi-value data and binary data processed by the computer. A multi-value image signal line and binary image signal line are separately placed between the copying machine and the IU so that both components can optimally process images. In this type of system, it is natural that characters and line images edited by the computer are colored and then printed out. In such a case, it is impossible to color the characters and line images on the basis of only data transmitted through the binary image signal line. Therefore, the copying machine first receives information on colors and a color zone so as to color the binary image data, and then a binary image signal to process it. The same binary image data is transmitted from the IU to the copying machine color plane by color plane because of the above process and because, when the binary image data and image data read by the scanner of the copying machine are superimposed on each other, printing of the image information in a zone assigned to the binary image data is prohibited.

Because of an increase in the demand for presentation, there have been a number of apparatuses used as so-called DTP systems, in which a PDL, such as Post Script (hereinafter referred to as PS) of Adobe Company, is used to output color characters and line images composed of binary data.

Also in the above system, in the same manner as described above, to provide an interface between a computer and a copying machine, these components are connected to each other through an interface unit (hereinafter called a PS-IU) having a memory. The PS from the computer is converted into a raster image by an interpreter in the PS-IU and then transmitted to the copying machine as a binary signal. In such a case, unlike in the case of the IU mentioned previously where the same binary image data is transmitted color plane by color plane, binary image data corresponding to the coloring material of each plane is transmitted from the PS-IU to the copying machine.

However, in each of the system types mentioned above, the structure of binary image data processed by the computer differs from that of binary image data processed by the copying machine. For this reason, if data transmitted from both the computer and the copying machine is processed by, for example, the copying machine, an interface used for the IU or PS-IU must be provided in the copying machine. In addition, software for controlling the sequence of the operation of the interface must be changed, thus making the structure of the copying machine complicated.

In the above-mentioned DTP system, the copying machine converts binary image data, transmitted through the PS-IU in accordance with the coloring material of each color plane, into fixed multi-value image data. It is therefore impossible to change the density and color of the binary image data.

In the above-noted known DTP system, of course, the color balance and the density key of the copying machine are capable of changing the color and density. However, once such change has been made, the color and density cannot be changed again even during normal printing. The color and density must therefore be readjusted every time a printing operation is performed. Also, when multi-value images, such as natural images, and binary images in the PDL are printed on the same recording paper, adjustment by the color balance to the color and density of the binary images adversely affects the color and density of the multi-value images.

As described previously, in the case of the IU, since the copying machine first receives information on color used for the binary image data, the computer is capable of adjusting the color and density of the binary image data. However, if the color and density are adjusted by the color balance and the density key of the copying machine, it is impossible to obtain the desired color and density.

SUMMARY OF THE INVENTION

The present invention solves the above-mentioned problems simultaneously or one by one.

An object of this invention is to provide an image processing system capable of connecting a type of image processing unit to another type of image processing unit.

Another object of this invention is to provide an image processing system capable of connecting a type of image processing unit to another type of image processing unit and changing the color and density of an image when the image is formed.

To achieve the above objects, this invention provides an image processing system which comprises setting means for setting density data, first processing means for processing first image data in accordance with first density data set by the setting means, second processing means for processing second image data in accordance with second density data set by the setting means and information on the formation of an image composed of the second image data, synthesizing means for synthesizing the first image data output from the first processing means and the second image data output from the second processing means, and forming means for forming an image based on image data output from the synthesizing means.

A further object is to provide a color image processing apparatus constituting the above image processing system which achieves the above objects.

Yet another object is to provide a novel interface used for the above image processing system which achieves the above objects.

Other objects, features and advantages of this invention will become more fully apparent from the following detailed description of the preferred embodiments taken in connection with the accompanying drawings.

BRIEF DESCRIPTION OF THE DRAWINGS

FIGS. 6(a) and 6(b) are timing charts showing when data is received from an IU and a PS-IU, respectively;

DESCRIPTION OF THE PREFERRED EMBODIMENTS

A first preferred embodiment of the present invention will be described in detail with reference to the accompanying drawings.

Figure 1:
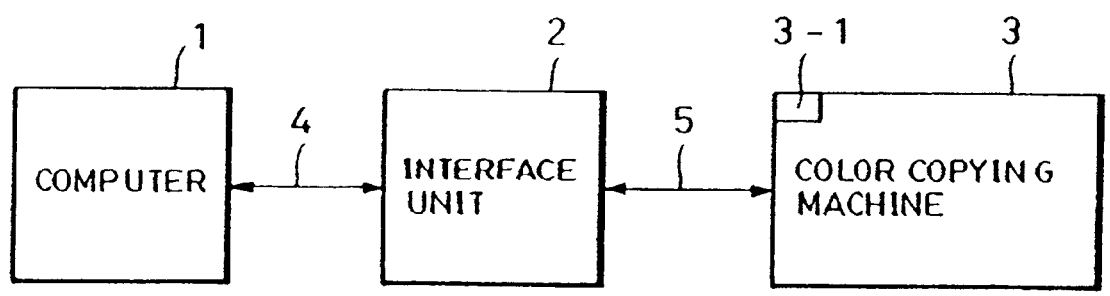
FIG. 1 is a view showing the outline of a first embodiment of an image processing system in accordance with the present invention.

FIG. 1 shows an example of the general structure of the first embodiment of an image processing system in accordance with the present invention. Referring to FIG. 1, numeral 1 denotes a computer for producing and editing various types of images. Numeral 3 denotes a so-called copying machine composed of an image reading unit or scanner and an image forming unit or printer. It has an interface capable of outputting an image which has been scanned to the outside or printing out image data input from the outside. In this embodiment, the copying machine 3 is a so-called plane sequence printer in which colors, such as yellow, magenta and cyan, are printed in a plane sequence and then superimposed on each other. It employs, for example, electrophotographic and thermal transfer processes. Numeral 2 denotes an interface unit for providing an interface between the computer 1 and the copying machine 3. It is connected to the computer 1 through a general-purpose interface 4, such as GPIB, SCSI or RS232. The interface unit 2 is connected to the copying machine 3 via a so-called device-dependent video interface 5. Signal lines are connected to the interface unit 2. Data transmitted through the signal lines are used for outputting an image in accordance with the speeds at which the copying machine 3 performs scanning or printing.

Figure 2:
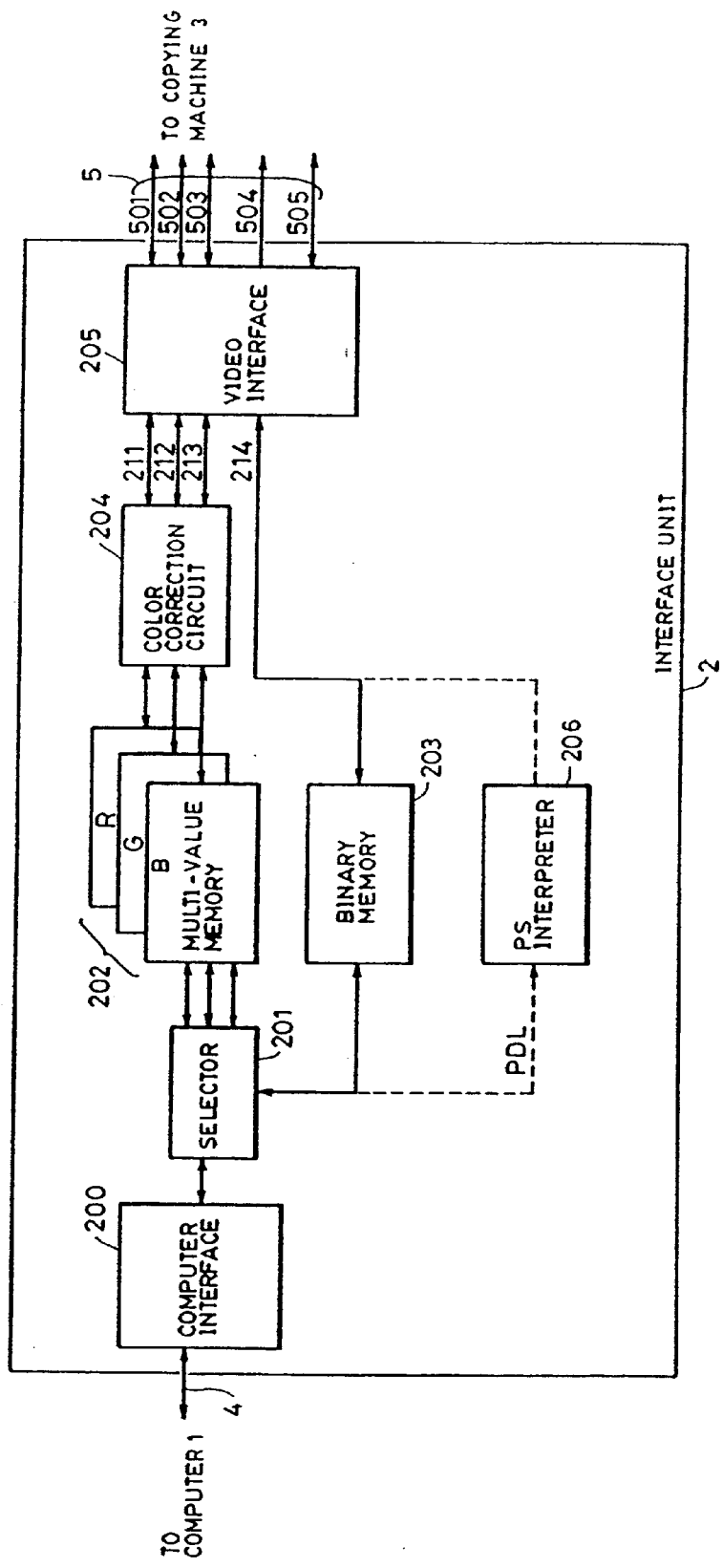
FIG. 2 is a block diagram of an external unit shown in FIG. 1.

FIG. 2 is a simplified block diagram showing the main components of the interface unit 2. Image data created by the computer 1 is roughly classified into multi-value data handling natural images and binary data handling images, such as characters and line images. The interface unit 2 of this embodiment is composed of memories 202 for multi-value images corresponding to the multi-value data and another memory 203 for binary images corresponding to binary data so that these two types of data items can be handled easily.

Referring to FIG. 2, a computer interface 200 performs handshaking with the general-purpose interface 4 connected to the computer 1. The computer interface 200 inputs a multi-value image to or outputs it from the multi-value memories 202, and also inputs a binary image to or outputs it from the binary memory 203. These inputs and outputs are performed with the aid of a selector 201 by controlling a CPU through a CPU bus (not shown). The computer interface 200 controls, in addition to a control command for the image data, a control command for the color copying machine 3. It also controls information on printing, such as information on coloring the binary image and information on coordinates used for such coloring. Such information is output to a video interface 205 as required. The computer interface 200 informs, through a control line 505 described later, the color copying machine 3 of the control command and the information on printing. Multi-value data items, which are red (R), green (G) and blue (B) luminance data items, are stored in the multi-value memories 202 and converted by a color correction circuit 204 into density data items of toner components, the toner components being coloring materials used in the color copying machine 3. A density data item, for example, an R component, together with the control command and the information on printing which are sent through the control line 505, is transmitted to the color copying machine 3 through a signal line 211 and another signal line 501. The density data items transmitted through the signal lines are color data items, such as yellow (Y), magenta (M) and cyan (C) data items, which are output in a plane sequence in unison with a printing operation performed by the color copying machine 3. Similarly, binary image data stored in the binary memory 203 is transmitted to the color copying machine 3 through signal lines 214 and 504 and the video interface 205. This transmission is synchronous with and parallel to the transmission of the multi-value data described above. In this embodiment, the signal lines 211 to 213 and 501 to 503 are all bidirectional lines. R, G and B image data items which have been read by the scanner of the color copying machine 3 are transmitted through the signal lines 501, 502 and 503, respectively, and then the video interface 205 and the color correction circuit 204. These data items are then stored in the multi-value memories 202. During the above operation, the image data transmitted from the scanner is binarized as required by a comparator (not shown) in the video interface 205. Binarized data is then stored with the aid of the selector 201 in the binary memory 203. The binary and multi-value data stored in the binary memory 203 and multi-value memories 202 can be output to the computer 1 on the basis of an instruction from the computer 1. The control line 505 comprises a line used for controlling the transfer of image data described later and a communication control line used for transmitting information to and receiving it from the color copying machine 3. Numeral 206 denotes a PS interpreter for expanding an image drawing command.

Figure 3:
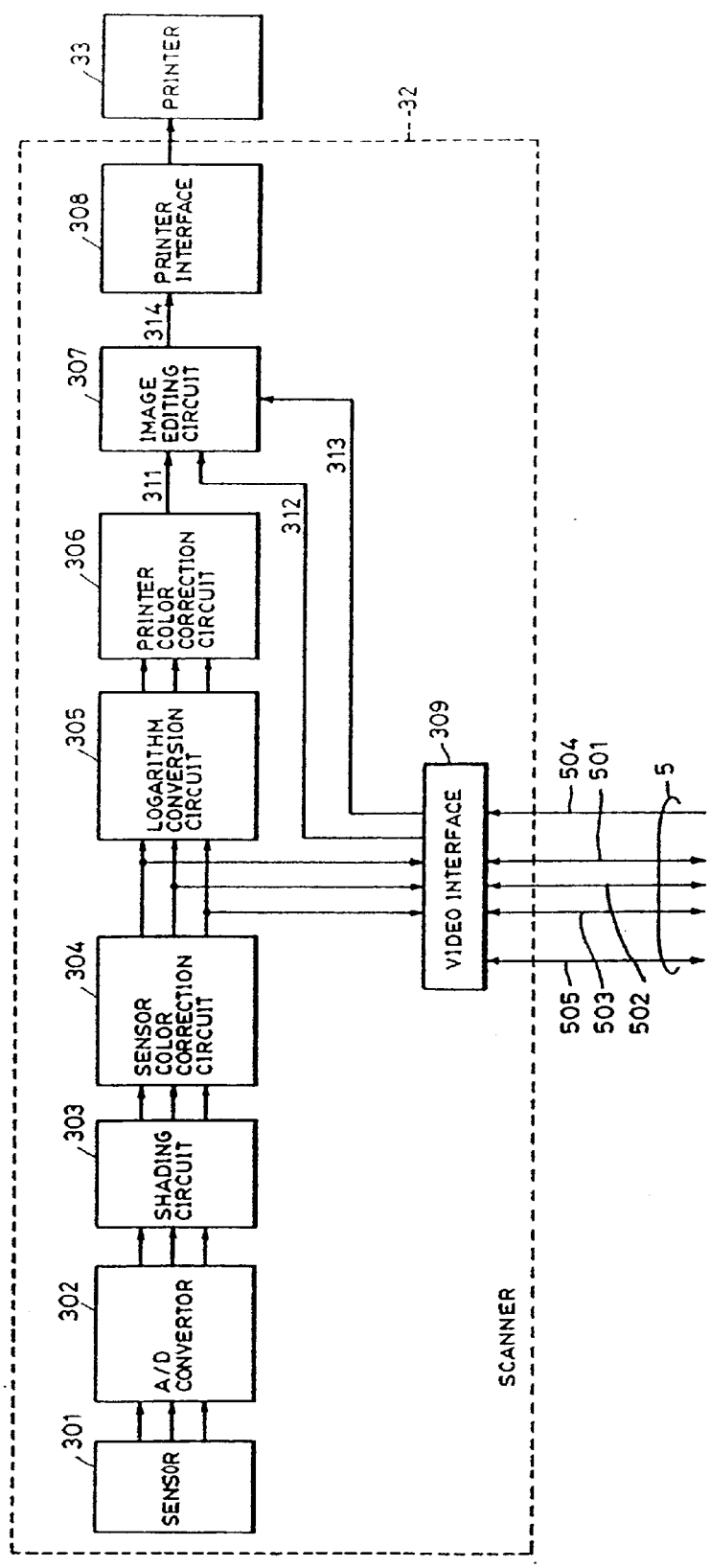
FIG. 3 is a block diagram of a scanner in a color copying machine shown in FIG. 1.

FIG. 3 is a block diagram of the scanner constituting the color copying machine 3. In FIG. 3, numeral 301 denotes a line sensor, which is a photoelectric conversion element, such as a CCD, having a color separation filter. A motor or the like is used to move the line sensor 301 relative to the manuscript (not shown) so that a color image can be read.

Analog R, G and B image signals output from the line sensor 301 are input to an A/D convertor 302, where these image signals are converted into digital R, G and B signals. The digital R, G and B signals output from the A/D convertor 302 are input to a shading correction circuit 303, where a shading correction is performed so as to correct an irregular quantity of light and the output characteristics of pixels. Thus, the corrected image signals are then input to a sensor color correction circuit 304, where a color correction is carried out to change the spectral characteristics of the color separation filter of the sensor 301 to R, G and B data items conforming to a predetermined color space and NTSC standard. The R, G and B data items, which are luminance data items, are converted into logarithms by a logarithm conversion circuit 305 and then into density data items. Color correction is performed by a printer color correction circuit 306 so as to conform to the spectral reflection characteristics of toner, the toner being a coloring material used in the printer. Color separation image data items which have been input in parallel to the R, G and B data items are converted by the printer color correction circuit 306 into image data items in a plane sequence.

When the image data from the line sensor 301 is printed, the manuscript is repeatedly read the number of times corresponding to the number of coloring materials used in the printer. Thus, color separation image data generated by repeatedly reading the manuscript is input to the printer color correction circuit 306. In this embodiment, the printer can print out a full range of colors by overlapping several types of basic coloring materials with each other. Cyan (C), magenta (M), yellow (Y) and black (bk) are used as the basic coloring materials. Three or more types of coloring materials may also be used.

The image data output from the printer color correction circuit 306 is input to an image editing circuit 307, which is the essential component of this invention. The image editing circuit 307 is capable of processing and editing an image in a programmable manner based on area codes generated by an area code generator described later. The image data from the image editing circuit 307 is transmitted through a printer interface 308 to a printer 33, where it is printed.

The above description pertains to the flow of image data when an image is processed by the color copying machine 3. The flow of image data from the interface unit 2 will now be described.

When a scanned image is input to the interface unit 2 through a video interface unit 309, the same processes as those described above are performed until the scanned image reaches the sensor color correction circuit 304. The R, G and B signals conforming to the color space of NTSC mentioned above are input to the video interface 309, transmitted through signal lines 501, 502 and 503, respectively, and then stored in either the memories 202 or 203 in the interface unit 2.

The multi-value image data and binary image data stored in the memories of the interface unit 2 are transmitted color plane by color plane to the image editing circuit 307 through signal lines 501 and 504, the video interface 309, and signal lines 312 and 313. The multi-value image data and binary image data are controlled in accordance with a specified mode and then are provided on line 314 to a printer interface 308 and output to a printer 33. In this case, positional information on the image and information on coloration of characters and the like are transmitted beforehand from the interface unit 2 through the control line 505 and the video interface 309. The image editing circuit 307 controls the binary and multi-value image data on the basis of the above two types of information.

Figure 4:
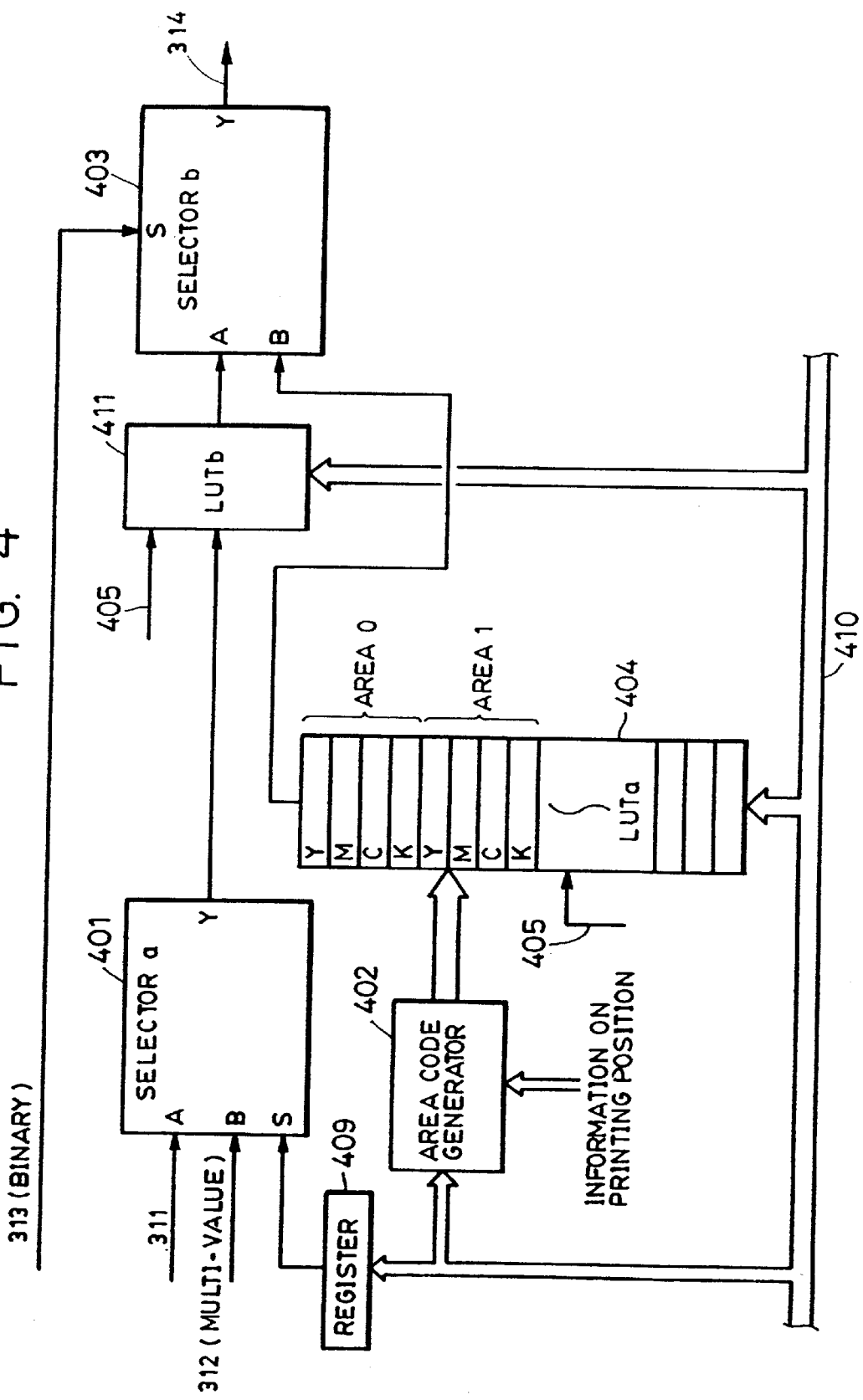
FIG. 4 is a block diagram of the image editing circuit 307 shown in FIG. 3.

FIG. 4 is a block diagram showing an example of the structure of the image editing circuit 307.

In FIG. 4, numeral 401 denotes a selector a. The multi-value image data is input from the printer color correction circuit 306 (FIG. 3) to an input terminal A through the signal line 311. The multi-value image data is also input to an input terminal B from the interface unit 309 (FIG. 3) and the signal line 312. A selection signal is input from a register 409 to a selection terminal S of the selector a. Data is stored in the register 409 via a CPU bus 410 in the color copying machine 3.

When multi-value image data, read by the scanner 32, and another multi-value image data transmitted through the interface unit 2, are synthesized together, the selector a selects and outputs image data which has been input on the basis of the selection signal. The selection signal corresponds to a change instruction and the positional information input from the computer 1 to the color copying machine 3 through the interface unit 2.

Numeral 402 denotes an area code generator. It outputs codes corresponding to areas on the basis of the positional information described previously, area information and positional information on printing, all types of information being input through the CPU bus 410. The positional information on printing is output in real time synchronously with the printing operation of the printer 33.

Numeral 404 denotes a Look-Up Table (LUT) a composed of components such as a RAM. It outputs, for example, 8-bit data corresponding to the area codes, input from the area code generator 402, and a 2-bit color selection signal. The 2-bit color selection signal is transmitted through a signal line 405 and indicates the coloring material being used by the printer 33. YMCK data corresponding to information used for specifying colors to be printed is stored beforehand in the LUT a. This information is input from the computer 1 to the color copying machine 3 via the interface unit 2. When the printer 33 is printing, for example, a Y component, the color selection signal is a signal indicating "01".

Numeral 411 denotes a LUT b composed of a RAM having a memory capacity of, for instance, 1024 bytes assigned to four colors, 256 bytes to each color. The LUT b outputs data corresponding to the color selection signal and image data input through the selector a. Any conversion data can be stored in the LUT b through the CPU bus 410. The conversion data is usually set so that the desired color and density can be printed by, for example, adjusting the color balance of the operating unit 31 shown in FIG. 7.

Numeral 403 denotes a selector b. Data output from the LUT b is input to an input terminal A, and data output from the LUT a is input to an input terminal B. Binary image data is input from the interface unit to a selection terminal S through the signal line 313. When the binary image data input to the selection terminal S is "0", the selector b selects and outputs image data input to the input terminal A. Likewise, when it is "1", the selector b selects and outputs image data input to the input terminal B. In other words, when the binary image data input to the selection terminal S is "1", the selector b outputs data corresponding to a color plane at this moment. The output from the selector b on line 314 is the output from the image editing circuit 307.

Figure 5:
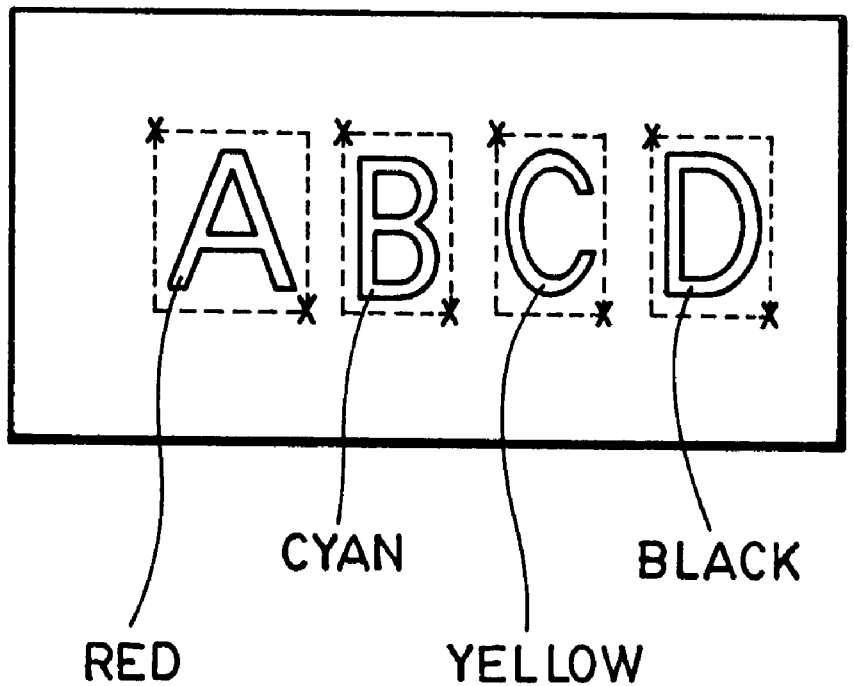
FIG. 5 is a view showing an output sample.

FIG. 5 is a view showing a sample of binary image data, the data being transmitted through the interface unit 309 (FIG. 3) and printed by the printer 33. Letters, "A", "B", "C" and "D", arranged from "A" parallel to the paper feed direction, are printed in red, cyan, yellow and black, respectively.

A description will now be given of a process for outputting the printing results shown in FIG. 5. In the following description, area 0 corresponds to an area surrounding letter "A"; area 1 corresponds to an area surrounding letter "B"; area 2 corresponds to an area surrounding letter "C"; and area 3 corresponds to an area surrounding letter "D".

First, a description will be given of the above-mentioned process when the interface unit 2 shown in FIG. 2 operates as an IU mentioned previously.

Information on areas 0 through 3 (hereinafter referred to as area information) and information on color in each area (hereinafter called color information) are transmitted from the computer 1 to the color copying machine 3 via the interface unit 2. On the basis of the above two types of information, the color copying machine 3 first transmits data described later to the LUT a (404) shown in FIG. 4 through the CPU bus 410. The color copying machine 3 then transmits the area information to the area code generator 402 so that the area code generator 402 outputs area codes corresponding to the area information. The time at which the area code generator outputs the area codes is synchronized with the time at which binary data is read from the binary memory 203 shown in FIG. 2. This synchronization is based on the positional information on printing, which is described previously and input to the area code generator 402.

Since the color information corresponding to area 0 is red, for example, the data items Y=FF, M=FF, C=0 and K=0 are set in the registers of area 0 of the LUT a (404). Similarly, since the color information corresponding to area 1 is cyan, for example, the data items Y=FF, M=0, C=0 and K=0 are set in the registers of area 0; since the color information corresponding to area 2 is yellow, for example, the data items Y=FF, M=0, C=0 and K=0 are set in the registers of area 2; and since the color information corresponding to area 3 is black, for example, the data items Y=0, M=0, C=0 and K=FF are set in the registers of area 3.

After the above setting has been made, the color copying machine 3 starts printing upon receiving a printing instruction from the computer 1.

FIGS. 6(a) and 6(b) are timing charts showing when a printing operation is performed in this embodiment. A signal ITOP shown in FIGS. 6(a) and 6(b) is a signal which is synchronous with a plane sequence and output from the printer 33. The image data transmitted at the rise time of the signal ITOP is printed on the lead edge of the recording paper.

In FIG. 6(a), registers M in the LUT a are selected by the color selection signal in cycle M. The data in each register M of each area 0 through 3 (letters "A" through "D") is sequentially output so as to conform to the printing position. When binary data input through the interface unit 2 is "1", data output from registers M is selected by the selector b and transmitted to the printer 33. In this case, only letter "A" is printed with coloring material M. In the same manner as described above, in cycle C only letter "B" is printed with coloring material C; in cycle Y letters "A" and "C" are printed with coloring material Y; and in cycle K only letter "D" is printed with coloring material K. The printing results shown in FIG. 5 are thus obtained.

A description will be given of the process for outputting the printing results when the interface unit 2 shown in FIG. 2 operates as a PS-IU mentioned previously.

In this case, binary data corresponding to the coloring materials is transmitted through the interface unit 2 to the color copying machine 3, so that the printing operation is performed as shown in FIG. 6(b), which is a timing chart.

The area code generator 402 is operated with the aid of the CPU bus 410 so as to always output an area code indicating area 0 of the LUT a (404) regardless of the positional information on printing. For example, the data items Y=FF, M=FF, C=FF and K=FF are stored in the registers of area 0 in the LUT a (404). In other words, the printer 33 prints all binary image data transmitted during all color cycles using all coloring materials.

Figure 7:
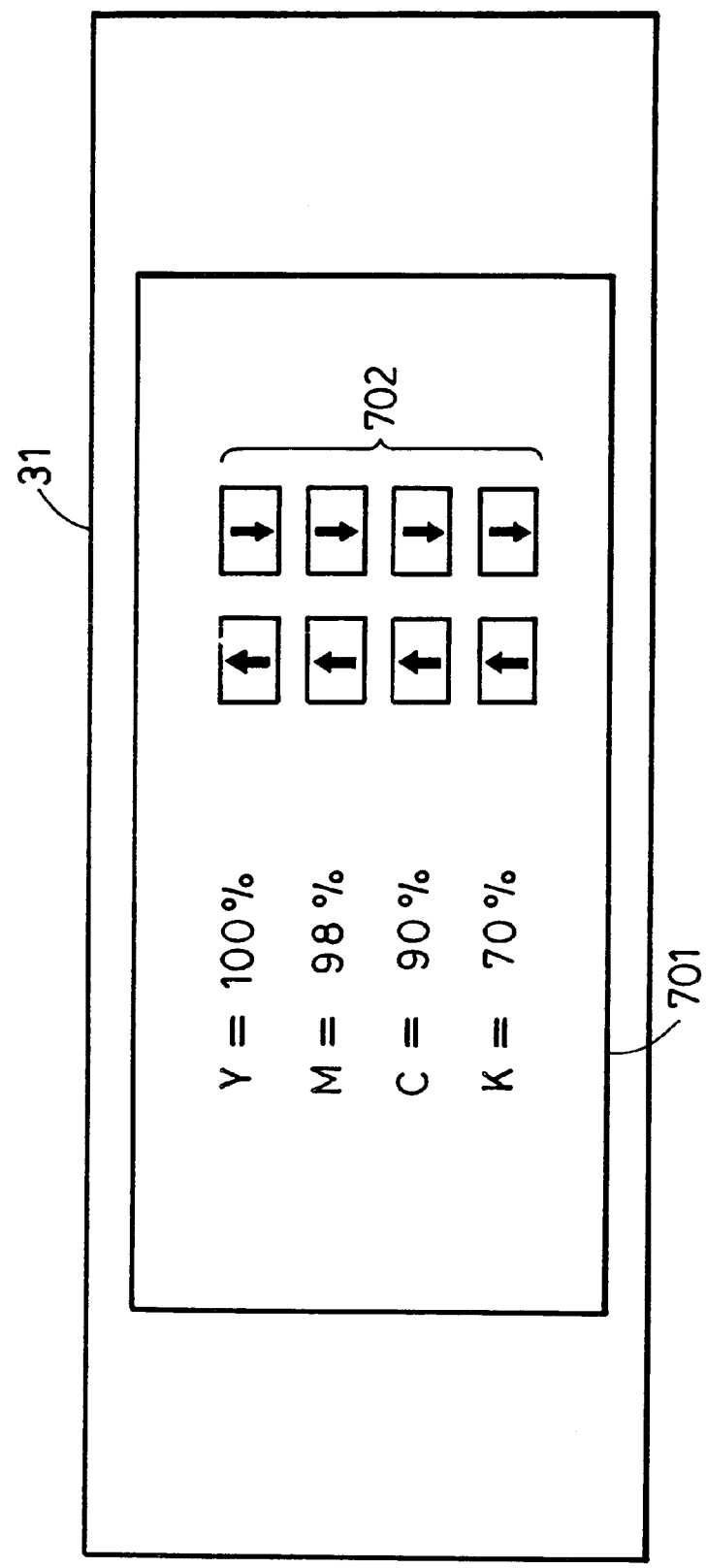
FIG. 7 is a view showing an example of a screen on the operating unit 3-1 of the color copying machine 3 shown in FIG. 1.

Data to be assigned to area 0 of the LUT a (404) can be set so that, in substantially the same manner as with the color balance stored in the LUT b (411) mentioned above, the desired color and density are printed by, for example, adjusting the color balance of the operating unit 31 shown in FIG. 7.

FIG. 7 shows an example of the screen of the operating unit 31 which adjusts the density of each color. Instructions can be input by actuating keys 702 on the translucent touch-sensitive screen of an LCD 701. The density of each color can be adjusted by increments of 1% and displayed on the LCD 701.

For example, 100% density corresponds to data "FF", and 50% density corresponds to data "80". Instead of adjusting the density by actuating the keys 702 as shown in FIG. 7, data indicating density may be input directly. The density which has been adjusted is retained, even when the power for the color copying machine and the like is turned off, and therefore it is not necessary to readjust the density whenever the power is turned on.

As has been described above, according to this embodiment, because data to be set in the LUT a (404) can be adjusted using the operating unit 31, binary image data transmitted through the interface unit 2 can be printed with the desired color and density.

The density and the color balance of the color copying machine 3 under ordinary operating conditions are stored in the LUT b (411) independent of processing binary image data. Therefore, color and density adjusted so as to conform to binary image data do not affect the ordinary copy operation. In addition, when multi-value images, such as natural images, and binary images created in PDL are printed on the same recording paper, these two types of images are first processed separately and then selected by the selector b. Therefore, color and density adjusted to conform to the binary image data do not affect the color and density of the multi-value image data.

A second embodiment of an image processing system according to this invention will be described. The structure of the copying machine in the first embodiment differs from that of a copying machine in the second embodiment. Other components are substantially the same in both embodiments. Substantially the same components are identified by the like reference characters, and the detailed explanations thereof are omitted.

Figure 8:
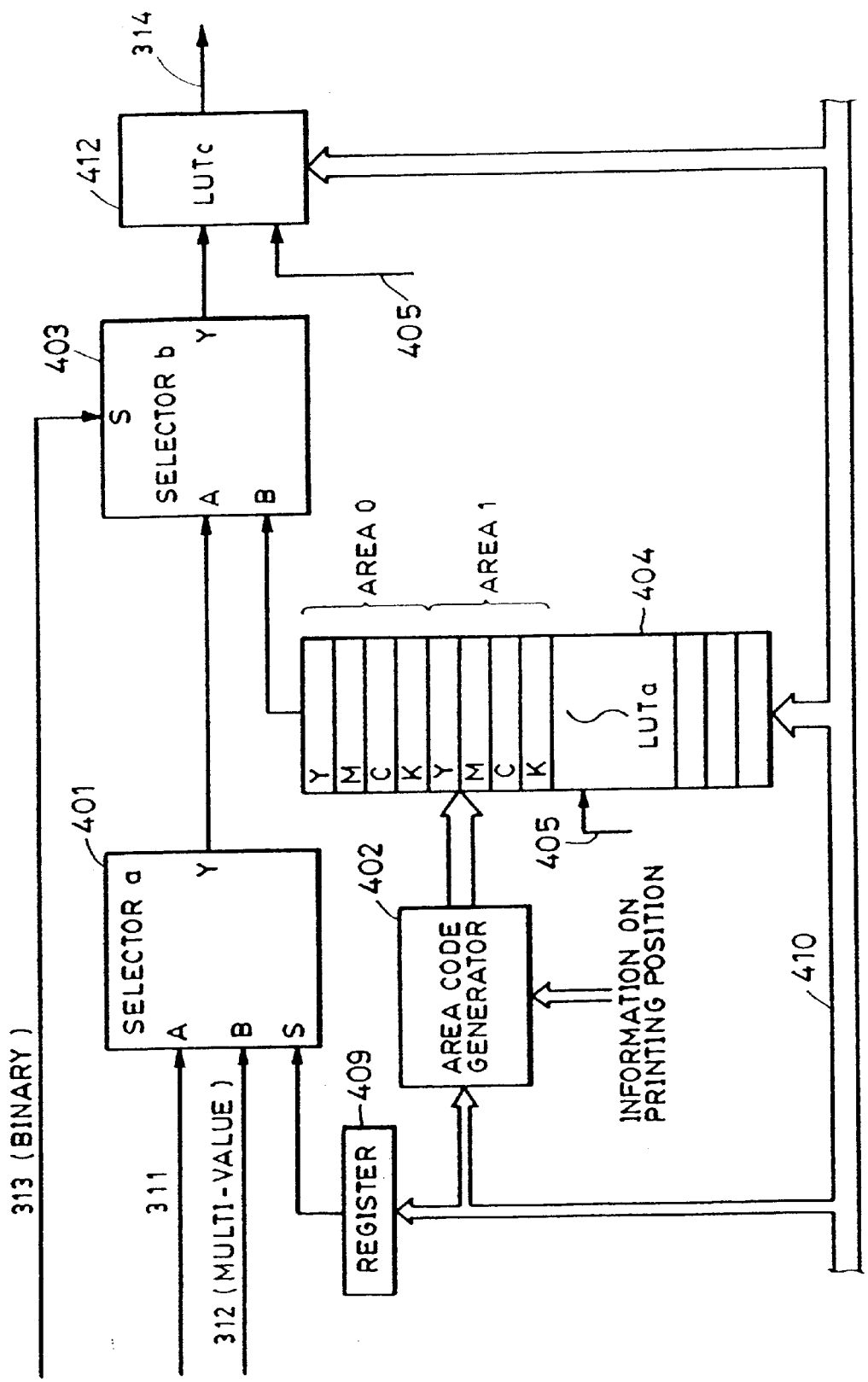
FIG. 8 is a view showing the outline of a second embodiment of the image editing circuit 307 shown in FIG. 3.

FIG. 8 is a block diagram showing a second embodiment of the image editing circuit 307.

In FIG. 8, when binary image data input to a selection terminal S is "0", a selector b selects data transmitted through a selector a to an input terminal A, and then outputs it to a LUT c (412). Similarly, when binary image data input to the selection terminal S is "1", a selector b selects data transmitted through a selector a to an input terminal B, and then outputs it to a LUT c (412). In other words, when the binary image data input to the selection terminal S is "1", the selector b outputs data corresponding to a color plane at this moment.

The LUT c (412) composed of a RAM having a memory capacity of, for instance, 1024 bytes assigned to four colors, 256 bytes to each color. The LUT c (412) outputs data on line 314 corresponding to a color selection signal and image data input through the selector b. Any conversion data can be stored in the LUT c (412) through the CPU bus 410. The conversion data is usually set so that the desired color and density can be printed by, for example, adjusting the color balance of the operating unit 31 shown in FIG. 7. The output from the LUT c (412) on line 314 is the output from the image editing circuit 307.

As has been described above, this embodiment provides substantially the same advantages as those described in the first embodiment. Because the operating unit 31 can be used to adjust data stored in the LUT a (404), it is possible to print binary image data, which is transmitted to the color copying machine 3 through the interface unit 2, with the desired color and density.

In addition to data "FF", other types of data may also be stored in registers in this embodiment.

The above-described embodiment is a color image processing system which receives binary image data from an external device, which generates the binary image data, so as to form color images. This system has a first mode in which a receiving side receives the same binary image signal color plane by color plane so that a color process is performed. It also has a second mode in which a printer receives binary image data in a plane sequence, which data indicates color planes corresponding to the types of coloring materials used for a printing operation of the printer, and then, the printer performs binary printing in accordance with the binary image data. Indicating means for indicating the first or second mode selects the first or second mode with respect to the binary image data from the interface unit.

In this embodiment, it is possible for an operating unit 3-1 of the color copying machine 3 to specify in a service mode two types of processes for handling binary data. When the binary data is to be printed, the service mode changes the control of the processes.

The two types of processes can be selected by communication between the color copying machine and the external unit. In other words, with the aid of communication transmitted through the control line 505, the color copying machine may select either type by determining the characteristics of the color copying machine and the external unit. Instead of using the control line 505, for example, the interface unit 2 may pull up or down an unused signal line of a connector linked to the color copying machine and the interface unit 2 so that the color copying machine can select either type of process.

This embodiment may apply to a system composed of either one device or a plurality of devices.

Needless to say, this invention may also apply where the programs of this invention are supplied to systems or devices.

This embodiment is capable of forming images composed of either first image data processed in accordance with first density data or second image data processed in accordance with second density data.

What is claimed is:

1. A color image processing system comprising:

receiving means for receiving frame sequential binary image data from an external device;

means for processing frame sequential binary image data, wherein said processing means processes the frame sequential binary image data based on predetermined coloring information in a first mode, and said processing means processes the frame sequential binary image data as a colored frame sequential binary image data in a second mode, and wherein said predetermined coloring information includes values for four color components.

2. A color image processing system according to claim 1, further comprising means for setting either one of said first and second modes, based on a given manual instruction.

3. A color image processing system according to claim 1, further comprising means for setting either of said first and second modes based on information from the external device.

4. A color image processing system according to claim 1, wherein the colored frame sequential binary image data includes yellow, magenta, cyan, black frame sequential binary image.

5. A color image processing system comprising:

a receiving unit adapted to receive frame sequential binary image data from an external device;

a processing unit adapted to process frame sequential binary image data, wherein said processing unit processes the frame sequential binary image data based on predetermined coloring information in a first mode, and said processing unit processes the frame sequential binary image data as a colored frame sequential binary image data in a second mode, and wherein said predetermined coloring information includes values for four color components.

6. A color image processing system according to claim 5, further comprising a setting unit adapted to set either one of said first and second modes, based on a given manual instruction.

7. A color image processing system according to claim 5, further comprising a setting unit adapted to set either of said first and second modes based on information from the external device.

8. A color image processing system according to claim 5, wherein the colored frame sequential binary image data includes yellow, magenta, cyan, black frame sequential binary image.

* * * * *